United States Patent [19]

Schirmer et al.

[11] Patent Number: 5,158,836

[45] Date of Patent: Oct. 27, 1992

[54] ORIENTED FILM OF HIGH CLARITY AND GLOSS

[75] Inventors: Henry G. Schirmer; Stephen F. Compton, both of Spartanburg; Martin Nelson, Greer, all of S.C.

[73] Assignee: W. R. Grace & Co.-Conn., Duncan, S.C.

[21] Appl. No.: 656,703

[22] Filed: Feb. 21, 1991

[51] Int. Cl.⁵ .............................................. B32B 27/08
[52] U.S. Cl. ................................... 428/336; 428/517; 428/520; 428/910
[58] Field of Search ............... 428/517, 520, 910, 336, 428/34.9

[56] References Cited

U.S. PATENT DOCUMENTS

| | | | |
|---|---|---|---|
| 3,456,044 | 7/1969 | Pahlke | 264/25 |
| 3,555,604 | 1/1971 | Pahlke | 18/14 |
| 3,894,907 | 7/1975 | Sudo | 156/494 |
| 3,932,563 | 1/1976 | Argurio et al. | 260/897 |
| 4,048,378 | 9/1977 | Pelzek | 428/483 |
| 4,066,811 | 1/1978 | Naito et al. | 428/220 |
| 4,073,782 | 2/1978 | Kishi et al. | 260/23 |
| 4,258,166 | 3/1981 | Canterino et al. | 526/348 |
| 4,277,578 | 7/1981 | Yoshimura et al. | 525/211 |
| 4,292,355 | 9/1981 | Bonis | 428/35 |
| 4,333,968 | 6/1982 | Nahmias | 427/173 |
| 4,354,997 | 10/1982 | Mizutani et al. | 264/560 |
| 4,355,076 | 10/1982 | Gash | 428/411 |
| 4,367,256 | 1/1983 | Biel | 428/218 |
| 4,389,450 | 6/1983 | Schaefer et al. | 428/212 |
| 4,390,587 | 6/1983 | Yoshimura et al. | 428/215 |
| 4,399,181 | 8/1983 | Yoshimura et al. | 428/213 |
| 4,421,823 | 12/1983 | Theisen et al. | 428/349 |
| 4,425,268 | 1/1984 | Cooper | 524/110 |
| 4,440,824 | 4/1984 | Bonis | 428/216 |
| 4,464,439 | 8/1984 | Castelein | 428/517 |
| 4,484,971 | 11/1984 | Wang | 156/244 |
| 4,501,634 | 2/1985 | Yoshimura et al. | 156/244 |
| 4,524,099 | 6/1985 | Di Luccio | 428/213 |
| 4,588,650 | 5/1986 | Mientus et al. | 428/516 |
| 4,608,286 | 8/1986 | Motoishi et al. | 428/35 |
| 4,619,859 | 10/1986 | Yoshimura et al. | 428/213 |
| 4,626,455 | 12/1986 | Karabedian | 428/35 |
| 4,652,490 | 3/1987 | Arita et al. | 428/347 |
| 4,657,982 | 4/1987 | Breck et al. | 525/240 |
| 4,671,987 | 6/1987 | Knott, II et al. | 428/216 |
| 4,713,282 | 12/1987 | Yazaki et al. | 428/216 |
| 4,778,699 | 10/1988 | Knox, III et al. | 428/35 |
| 4,820,589 | 4/1989 | Dobreski et al. | 428/422 |
| 4,835,218 | 5/1989 | Yoshimura et al. | 525/98 |
| 4,840,823 | 6/1989 | Chigami et al. | 428/355 |
| 4,863,769 | 9/1989 | Lustig et al. | 428/349 |
| 4,879,177 | 11/1989 | Boice | 428/34.9 |
| 4,897,274 | 1/1990 | Candida et al. | 428/517 |
| 4,923,722 | 5/1990 | Kondo et al. | 428/349 |
| 4,923,750 | 5/1990 | Jones | 428/349 |

FOREIGN PATENT DOCUMENTS

| | | |
|---|---|---|
| 0060526 | 3/1982 | European Pat. Off. . |
| 0092318 | 3/1983 | European Pat. Off. . |
| 0321957 | 6/1989 | European Pat. Off. . |
| 0333508 | 9/1989 | European Pat. Off. . |
| 0298700 | 11/1989 | European Pat. Off. . |
| 0120339 | 5/1989 | Japan . |
| 2123747 | 2/1984 | United Kingdom . |

Primary Examiner—Edith L. Buffalow
Attorney, Agent, or Firm—William D. Lee, Jr.; Jennifer L. Skord; Mark B. Quatt

[57] ABSTRACT

Polymeric, oriented films can be made by the use of a combination of a hot blown process and a blown bubble process. Styrene butadiene copolymer (SBC) forms two outer layers of the preferred embodiment, with a core layer of very low density polyethylene (VLDPE) or blends thereof, and intermediate polymeric adhesive layers such as ethylene vinyl acetate copolymer (EVA) bonding the core layer to the outer layers. A monoaxially or biaxially oriented film is produced with excellent optics.

11 Claims, 2 Drawing Sheets

ORIENTED FILM OF HIGH CLARITY AND GLOSS

BACKGROUND OF THE INVENTION

The present invention pertains to packaging film, and more particularly to a thin polymeric film suitable for replacing polyvinyl chloride film especially in packaging and labeling applications.

Polyvinyl chloride (PVC) has long been used in many applications in the packaging art. One particularly widespread application for PVC is the use of such material as an overwrap material for trayed retail cuts of meat and other food products in a retail environment such as a supermarket.

PVC has several desirable properties for this use. For example, it has excellent optics and good elasticity and stretch properties at use temperatures.

Unfortunately, PVC also has several disadvantages, including the production of hydrogen chloride gas during heat sealing and the generally corrosive effects of such gases in the packaging room.

It would be of great benefit to the packaging industry, and particular to applications requiring an instore film for overwrapping trayed food products, to provide a film with many of the advantages of PVC but without the disadvantages described above.

PVC is also used in producing labels for cans and bottles. It would also be of benefit to the label industry to provide a film which can be used as a label on a rigid container such as bottles and cans, but without the disadvantages of PVC.

Films or laminates used as label material for the labels of beverage bottles and the like are preferably monoaxially oriented in order to permit a tight label to be produced around the bottle or vessel, without undesirable wrinkling and shrinking of the label which can occur with some biaxially oriented films. These label films can also be used to produce band type seals for tamper evidence. Such label material ideally possesses several properties making it particularly useful for this end use.

For example, the material should have the required stiffness (i.e. higher modulus) to permit the use of the film or laminate in a roll stock form in conjunction with label manufacturing apparatus. Printability of the label is also desirable, as well as excellent optical properties.

The inventor has discovered that a relatively thin polymeric film, including a layer of a polyolefin, and more preferably very low density polyethylene (VLDPE), combined with a layer of styrene butadiene copolymer (SBC), produced by hot blowing and then stretch orienting the extruded film, exhibits excellent elasticity, toughness, stretch and optical properties.

Processes for producing oriented films, and oriented films themselves are disclosed in many patents including the following patents of interest.

U.S. Pat. No. 3,456,044 (Pahlke) mentions thin films of thicknesses less than 1 mil such as 0.5 mils, and discloses a double bubble method for biaxially orienting thermoplastic films including the steps of producing a primary tubing which is inflated by introducing air into the interior thereof, and a cooling ring 22, as well as squeeze rolls 34 and 28, with rolls 34 having a greater speed than rolls 28. Between the two pairs of squeeze rolls is a reinflated secondary bubble. If annealing is desired, the tubing can be reinflated to form a bubble 70.

U.S. Pat. No. 3,555,604 (Pahlke) is a patent based on a divisional application which was derived from the same priority application as the '044 patent described above, and discloses the same information described above for the '044 patent.

U.S. Pat. No. 4,258,166 (Canterino et al) discloses a uniaxially oriented plastic film material with improved strength and clarity in the direction of orientation preferably comprising homopolymers and copolymers of ethylene.

U.S. Pat. No. 4,355,076 (Gash) discloses monoaxially oriented polypropylene film laminated to a monoaxially oriented high density polyethylene film, the films produced by for example tubular blowing.

U.S. Pat. No. 4,440,824 (Bonis) discloses a thermoformable coextruded multilayer structure useful for thermoforming into containers, the structure having polyolefin coextruded with a high impact polystyrene layer. A five layer structure is shown.

U.S. Pat. No. 4,464,439 (Castelein) discloses a coextruded laminate having a sheet of polypropylene and a sheet of a mixture of high impact polystyrene, crystalline polypropylene, and styrene/dienic monomer block copolymer.

U.S. Pat. No. 4,626,455 (Karabedian) discloses a multilayer sheet and sleeve label for bottles, the sheet being a skin layer/brittle polystyrene foam layer structure, the skin layer comprising a polyolefin, a block copolymer of butadiene and styrene as compatability agent, and polystyrene.

U.S. Pat. No. 4,879,177 (Boice) discloses a monoaxially oriented shrink film having a core layer of butadiene styrene copolymer, outer layers of ethylene propylene copolymer, and intermediate bonding layers of ethylene copolymer.

It is an object of the present invention to provide a thermoplastic film useful as an overwrap material for trade retail cuts of meat and other food products in a super market or other retail environment.

It is also an object of the present invention to provide a thermoplastic film useful in forming labels or tamper evident bands for vessels such as bottles, cans, and the like.

It is also an object of the present invention to provide a film having excellent optical properties, specifically excellent gloss and clarity.

It is also an object of the present invention to provide a film which can be either primarily monoaxially oriented, or biaxially oriented to substantially the same extent in both its transverse and longitudinal directions.

SUMMARY OF THE INVENTION

In one aspect of the present invention, a biaxially oriented multilayer film comprises a core layer comprising a very low density polyethylene; two outer layers each comprising a styrene butadiene copolymer; and two intermediate layers each bonding the core layer to a respective outer layer, and comprising a polymeric adhesive.

In another aspect of the present invention, a method of making a thin biaxially oriented polymeric film comprises coextruding a first melt stream of a very low density polyethylene, a second and third melt stream of a polymeric adhesive, and a fourth and fifth melt stream of a styrene butadiene copolymer; extruding the melt streams through a tubular die such that the first melt stream forms the central layer of the coextrudate, and the fourth and fifth melt streams form the outer surfaces of the coextrudate; hot blowing the extruded film; heating the hot blown film to a temperature above its orientation temperature; directing the heated film through a first set of pinch rolls; reinflating the hot blown film by a blown bubble process wherein the bubble is expanded in both its longitudinal and transverse directions; and collapsing the reinflated film through a second set of pinch rolls.

In still another aspect of the present invention, a multilayer film oriented in primarily one direction, comprises a core layer comprising a very low density polyethylene; two outer layers each comprising styrene butadiene copolymer; and two intermediate layers each bonding the core layer to a respective outer layer, and comprising a polymeric adhesive.

In yet another aspect of the invention, a method of making a thin, polymeric film oriented in primarily one direction comprises extruding a first melt stream of very low density polyethylene, second and third melt streams of a polymeric adhesive, and fourth and fifth melt streams of styrene butadiene copolymer through a tubular die wherein the first melt stream forms the central layer of the coextrudate and the fourth and fifth melt streams form the outer surfaces of the coextrudate; hot blowing the coextruded film; heating the hot blown film to a temperature above its orientation temperature; directing the heated film through a first set of pinch rolls; inflating the hot blown film by a blown bubble process wherein the bubble is stretched in the longitudinal direction but substantially unstretched in the transverse direction; and collapsing the reinflated film through a second set of pinch rolls.

In yet another aspect of the invention, an oriented multilayer film comprises a first layer comprising very low density polyethylene; and a second layer adhered to the first layer, said second layer comprising a styrene butadiene copolymer.

DEFINITIONS

The term "polyolefin" is used herein in its stricter sense to mean a thermoplastic polymer derived from simple olefins. Among these are polyethylene, polypropylene and copolymers thereof with olefinic comonomers. For example, very low density polyethylene may be considered a linear ethylene copolymer with a comonomer comprising such materials as butene, hexene or octene. The term "polyolefin" is also used herein in a broader sense to include copolymers and terpolymers of ethylene with comonomers that are not themselves olefins, such as vinyl acetate (e.g. ethylene vinyl acetate copolymer or EVA).

The term "very low density polyethylene", or "VLDPE" is used herein to describe linear ethylene alpha-olefin copolymer (flexomer) having densities of generally between about 0.880 and 0.915 grams/cubic centimeter, and produced by a catalytic, low pressure process. "Ultra low density polyethylene" is also included in this term.

The term "ethylene vinyl acetate copolymer" (EVA) as used herein refers to a copolymer formed from ethylene and vinyl acetate monomers wherein the ethylene derived units are present in major amounts and the vinyl acetate derived units are present in minor amounts, generally one to 30 percent by weight.

The term "styrene butadiene copolymer" (SBC) is used herein to denote thermoplastic copolymers, especially block copolymers containing a major portion (greater than 50%) of styrene and a minor proportion (less than 50%) of butadiene comonomer.

The terms "melt flow" and "melt index" are used herein to mean the amount, in grams, of a thermoplastic resin which is forced through an orifice of specified length and diameter in ten minutes under prescribed conditions in accordance with ASTM D 1238.

The term "flow rate ratio" (FRR) is used to mean a dimensionless number derived by dividing the flow rate (melt flow or melt index) at one Condition with the flow rate at another Condition (ASTM D 1238). FRR is indicative of molecular weight distribution. The higher the FRR, the broader the molecular weight distribution.

BRIEF DESCRIPTION OF THE DRAWINGS

The invention may be further understood by reference to the drawings herein, where.

DESCRIPTION OF THE PREFERRED EMBODIMENTS

Figure 1:
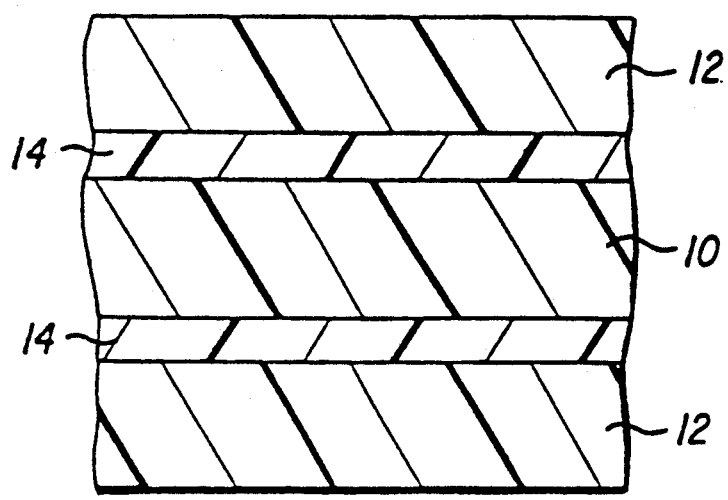
FIG. 1 is a schematic cross section of a preferred embodiment of a multilayer film in accordance with the invention.

The preferred film structure is a multilayer composite having a core layer 10 comprising a very low density polyethylene (VLDPE).

Preferred VLDPE resins are characterized by high molecular weight (i.e. relatively low melt index), broad molecular weight distribution (i.e. relatively high flow rate ratio), and relatively low crystallinity at processing temperatures.

For the VLDPE, a melt index (MI) of no more than about 0.15 grams/10 minutes (ASTM D 1238) (Condition 190/2.16) is preferred. A more preferred MI is 0.12 grams/10 minutes.

Preferred VLDPE resins can also be characterized by a melt index of no more than about 0.50 grams/10 minutes, more preferably no more than about 0.45 grams/10 minutes (ASTM D 1238) (Condition 190/5.0); no more than about 1.50 grams/10 minutes, and more preferably no more than about 1.35 grams/10 minutes (ASTM D 1238) (Condition 190/10.); or no more than about 10 grams/10 minutes, and more preferably no more than about 6 grams/10 minutes (ASTM D 1238) (Condition 190/21.601).

For the VLDPE, a molecular weight distribution (flow rate ratio) of at least about 10 ($I_{21}/I_5$) (ASTM D 1238) is preferred. This value is derived by dividing the flow rate at Condition 190/21.6 by the flow rate at Condition 190/5.0. A more preferred FRR is 13.

Preferred VLDPE resins can also be characterized by a FFR of at least about 40, more preferably at least about 50 ($I_{21}/I_{2.1}$) (ASTM D 1238). This value is derived by dividing the flow rate at Condition 190/21.6 by the flow rate at Condition 190/2.16.

An especially preferred VLDPE is a high molecular weight resin such as DEFD 1015 from Union Carbide. This resin has a density of about 0.900 grams/cc, a melt flow rate of about 6 grams/10 minutes (ASTM D 1238, Condition 190/21.601), and a FFR ($I_{21}/I_{2.1}$) of about 50.

Outer layers 12 comprise a styrene butadiene copolymer such as that commercially available from Phillips under the designation KR-10 having a butadiene content of 25% by weight of the copolymer; or KK 36 (for fatty food contact).

In the multilayer film of the invention, the outer layers 12 are bonded to the core layer 10 by means of intermediate layers 14 each comprising a polymeric adhesive and preferably a copolymer of ethylene, and more preferably an ethylene vinyl acetate copolymer (EVA). An even more preferred EVA is one having a vinyl acetate content above about 18% by weight of the copolymer, and more preferably about 28% by weight of the copolymer. Other polymeric materials may be used for layers 14 provided they process adequately in processes such as that disclosed in more detail below. Blends of polymeric materials and polymeric adhesives can also be used for intermediate layers 14.

For outer layers 12, SBC resins having minor amounts of butadiene, ranging from about 1 to 50%, are most preferred and provide an optimum balance of stiffness and flexibility to the film.

The films of the present invention are preferably made by coextrusion techniques well known in the art, combined with an apparatus and process depicted in FIG. 2 and described in more detail below.

Figure 2:
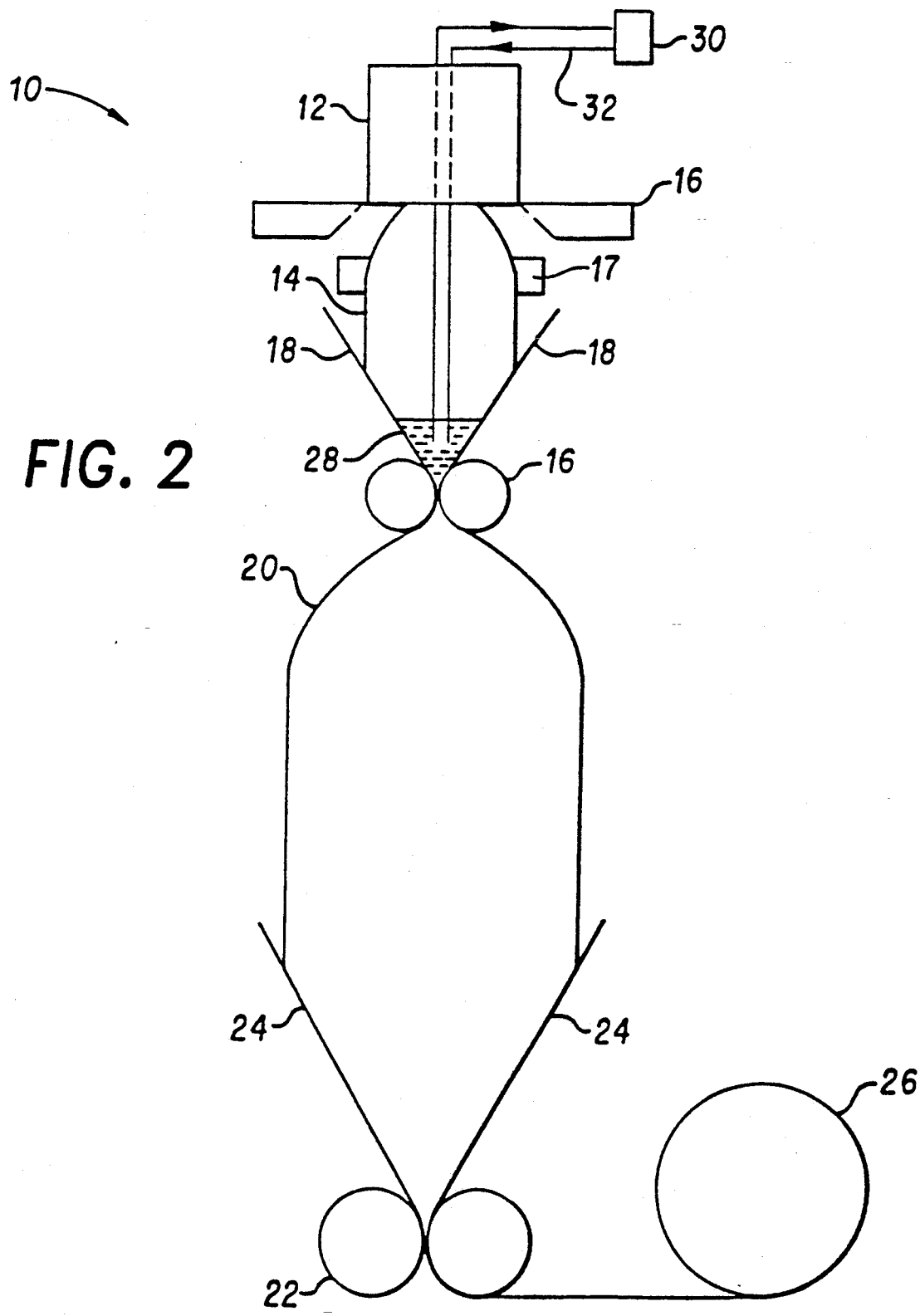
FIG. 2 is a schematic diagram indicating the apparatus and process by which the films of the present invention are made.

FIG. 2 shows schematically a device 10 for making the oriented films of the present invention.

Five melt streams, including a first melt stream of VLDPE, second and third melt streams of an ethylene copolymer such as EVA, and fourth and fifth melt streams of SBC are coextruded and exit as a coextrudate through an annular die 12 in a conventional manner. The extruded film is hot blown by conventional techniques to form a blown bubble 14.

The preferred process for carrying out the present invention permits the bubble to be reinflated into the secondary bubble 20 and then expanded to impart orientation of the material in primarily the transverse direction, primarily the longitudinal direction, or in both the transverse and longitudinal directions. This "flexibility" in the process permits films of the invention to be produced which are oriented primarily in one direction (monoaxially oriented films) or films which are oriented in both the longitudinal and transverse directions (biaxially oriented films).

Air cooling ring 16 positioned circumferentially around the blown bubble at the position shown cools the thermoplastic melt as it exits die 12.

An optional auxiliary chilling ring 17 may also be positioned circumferentially around the blown bubble down stream from air cooling ring 16 to further chill the hot blown film.

The primary bubble 14 is melt oriented in both the machine and transverse directions. Various blow up ratios may be used, but preferably the primary bubble 14 is hot blown to a blow up ratio of between 1.5 and 3.0.

The primary bubble 14 is collapsed at pinch rolls 16. To assist in this process, guide plates 18 are positioned at the extremities of the blown bubble 14.

The collapsed bubble is then reinflated in a blown bubble process to stretch orient the blown and collapsed film. This is done in a conventional manner by trapping air or other hot gas within the secondary bubble 20 so that the material stretches at its orientation temperature transversely to impart further orientation of the material in the transverse direction. The secondary bubble 20 is collapsed at a second set of pinch rolls 22. A second set of guide plates 24 may be employed to assist in the collapsing process.

The second set of pinch rolls 22 is rotated at a speed faster than the first set of pinch rolls 16 if it is desired to impart stretch orientation in the machine or longitudinal direction to the thermoplastic material.

The recollapsed bubble 20 then passes from the second set of pinch rolls 22 to take up roll 26.

The take up roll 26 may be a mill log which can be immediately stored or shipped to a distributor or customer, or may be stored for further processing such as slitting into single wound film, machine or natural center fold film. Thus, as used herein the take up roll 26 represents any further processing, storage, or further modification of the double wound, collapsed film once it exits the second set of pinch rolls 22, and is used herein to denote any of these possible further processing steps.

It is preferred that a reservoir 28 of heated fluid be disposed at the lower end of primary bubble 14 in such a way that the collapsing material drawn through the primary set of pinch rolls 16 will pass in communication with the heated fluid. In this manner, the film is more uniformly heated and temperature control can be achieved. Thickened tape edges can be substantially avoided by such means.

Although the heated fluid of reservoir 28 is preferably hot water, other media may be used if temperatures above the 212° F. limit of hot water are desired. For example propylene glycol (a food approved material), hot oil or hot emulsions may be used. One skilled in the art will understand that the exact nature of the heated fluid is not as critical as its effectiveness in helping to uniformly heat the collapsing bubble 14 as it is drawn through pinch rolls 16, and to uniformly heat the collapsing bubble 14 to a temperature above its orientation temperature.

The heated fluid may also be an "active" substance which not only reheats the surrounding film, but also actually coats the interior of the bubble as it passes over the reservoir. An example is a hot wax or other functional coating.

The heated fluid may be recirculated from the reservoir through a heating means 30 by means of conduits 32 or other suitable transfer means. Using the reservoir 28 of heated fluid, the types of materials which may be effectively used in the present process and device are increased.

Biaxially oriented films of the present invention are useful in overwrap applications for overwrapping retail cuts of meat and non-food products.

Monoaxially oriented films are useful in shrink label applications for producing labels for vessels such as bottles and cans.

The term "monoaxially oriented" is used herein to mean films oriented primarily in the longitudinal direction. However, some incidental orientation can be present in the transverse direction, and this is sometimes desirable to help the film to grip a container or vessel after heat shrinking and to reduce the incidence of wrinkles in the final label. The term can also be used to refer to films oriented primarily in the transverse direction, with or without some incidental orientation in the longitudinal direction.

The invention may be further understood by reference to the examples which follow.

The resins used in these examples are identified in Table 1.

TABLE 1

| RESIN | COMMERCIAL NAME | DESCRIPTION | COMPANY |
|---|---|---|---|
| $SBC_1$ | KR-10 | STYRENE BUTADIENE COPOLYMER | PHILLIPS |
| $SCB_2$ | KK-36 | STYRENE BUTADIENE COPOLYMER WITH FATTY FOOD COMPLIANCE | Phillips |
| $EVA_1$ | ELVAX 3182 | EVA (28% VA) MELT INDEX = grams/10 min. | DU PONT |
| $EVA_2$ | ELVAX 3165 | EVA (18% VA) MELT INDEX = 6 grams/10 min. | DU PONT |
| $EVA_3$ | 3170 | EVA (18% VA) MELT INDEX = 2.5 grams/10 min. | DU PONT |
| $VLDPE_1$ | XU 61509.32 | VERY LOW DENSITY POLYETHYLENE DENSITY = .911 grams/cc | DOW |
| $VLDPE_2$ | DEFD 1161 | VERY LOW DENSITY POLYETHYLENE | UNION CARBIDE |
| $VLDPE_3$ | TAFMER 0680 | VERY LOW DENSITY POLYETHYLENE DENSITY = .88 grams/cc | MITSUI |
| $VLDPE_4$ | 1015 | VERY LOW DENSITY POLYETHYLENE DENSITY = .900 grams/cc | UNION CARBIDE |
| $PL_1$ | 22-164 | 50% POLYISOBUTYLENE IN LLDPE | SANTECH |

EXAMPLE 1

A film having the construction $SBC_1/EVA_1/80\%$ $VLDPE_1 + 20\%$ $EVA_2/EVA_1/SBC_1$ was produced by the process described above. Tubular film was blown into pinch rolls and reinflated into a secondary bubble without losing width dimensions. The secondary bubble was stretched at a ratio of 2.5:1 in the machine direction and substantially unstretched in the transverse direction to produce an ultra-clear and glossy 1-mil film. The temperature of the liquid inside the liquid reservoir was 210° F.

The outer layers of $SBC_1$ each formed about 13% of the final film gauge. The core layer of the blend of 80% $VLDPE_1$ and 20% $EVA_2$ formed about 42% of the final film gauge by thickness. The intermediate adhesive layers of $EVA_1$ each comprised about 16% of the final film gauge.

The film of Example 1 was evaluated in bench top tests with soft drink cans. This film was formed into shrink labels that were wrapped around the cans. The material appeared to shrink adequately when shrunk at a temperature of 300° F. and a conveyor setting of 60% with a Weldotron 7141 tunnel. The material shrank tightly around the surface and contours of the can.

It was also noted that a drop of methylene chloride solvent, when placed on the surface of the film with the film pressed to it, resulted in immediate bonding to itself without film shrinkage.

The film of Example 1 was also used to overwrap a tray. Hot plate seals were made without undue film shrinkage. The hot plate temperature was 220° F.

Trim seals were also made with the film of Example 1 at 2.6 pounds with an L bar sealer.

When making the shrink labels for the bench top test, 4 inch width sections of the material were applied to 3⅛ inch outside diameter cores and shrunk at 300° F., with a conveyor setting of 60% on the Weldotron 7141 tunnel. The results indicated a width loss of approximately 3% (⅛ inch).

Seal strength evaluations conducted with the Weldotron L-bar sealer yielded a mean transverse seal strength of 2.6 pounds per linear inch with a standard deviation of 0.45 and a range of 2.0 to 3.3 pounds. Longitudinal evaluations resulted in material stretching until the film broke rather than the seal.

In producing the film of Example 1, the deflate roll speed in the primary bubble was about 30 feet per minute and the deflate roll speed in the secondary bubble was about 75 feet per minute.

The tubing width of the primary bubble at the deflate roll, and the final film width at the deflate roll of the secondary bubble were 28 inches.

The invention may be further understood with reference to the following additional examples listed in tabular form in Table 2.

TABLE 2

| EXAMPLE[1] | FILM STRUCTURE | PRIMARY | SECONDARY T | SECONDARY L | THICKNESS (MILS) | SOCK TEMP(°F.) |
|---|---|---|---|---|---|---|
| 2 | $SBC_1/EVA_2/80\%$ $VLDPE_2/EVA_2/SBC_1$[2] $+20\%$ $VLDPE_3$ | 2.33:1 | 2.9:1 | 3.1:1 | .30 | 210 |
| 3 | $SBC_1/EVA_2/80\%$ $VLDPE_2/EVA_2/SBC_1$[3] $+20\%$ $VLDPE_3$ | 2.33:1 | 2.9:1 | 3.1:1 | .27 | 210 |
| 4 | $SBC_1/EVA_2/80\%$ $VLDPE_2/EVA_2/SBC_1$[4] $+20\%$ $VLDPE_3$ | 3.1:1 | 1.0:1 | 2.0:1 | .70 | 210 |
| 5 | $SBC_1/EVA_2/80\%$ $VLDPE_2/EVA_2/SBC_1$ $+20\%$ $VLDPE_3$ | 2.97:1 | 1.6:1 | 1.7:1 | .40 | 210 |
| 6 | $SBC_1/EVA_2/80\%$ $VLDPE_2/EVA_2/SBC_1$[5] $+20\%$ $VLDPE_3$ | 2.02:1 | 3.1:1 | 3.0:1 | .60 | 210 |
| 7 | $SBC_1/EVA_2/80\%$ $VLDPE_1/EVA_2/SBC_1$[6] $+20\%$ $VLDPE_3$ | 2.02:1 | 3.1:1 | 3.1:1 | .30 | 209 |
| 8 | $SBC_1/EVA_2/80\%$ $VLDPE_1/EVA_2/SBC_1$[7] $+20\%$ $VLDPE_3$ | 2.02:1 | 3.1:1 | 3.1:1 | .30 | 209 |
| 9 | $SBC_1/EVA_2/80\%$ $VLDPE_1/EVA_2/SBC_1$[8] $+20\%$ $VLDPE_3$ | 2.44:1 | 2.5:1 | 3.1:1 | .30 | 210 |
| 10 | $SBC_1/EVA_2/80\%$ $VLDPE_1/EVA_2/SBC_1$[9] $+20\%$ $VLDPE_3$ | 2.44:1 | 2.5:1 | 3.1:1 | .30 | 210 |
| 11 | $SBC_2/EVA_2/80\%$ $VLDPE_1/EVA_2/SBC_2$[10] $+20\%$ $VLDPE_3$ | 2.33:1 | 2.77:1 | 3.1:1 | .35 | 210 |

TABLE 2-continued

| EXAMPLE[1] | FILM STRUCTURE | PRIMARY | SECONDARY THICKNESS | | | SOCK TEMP(°F.) |
|---|---|---|---|---|---|---|
| | | | T | L | (MILS) | |
| 12 | $SBC_1/EVA_2/80\%$ $VLDPE_2/EVA_2/SBC_1$[11] +20% $VLDPE_3$ | 2.44:1 | 2.61:1 | 3.1:1 | .35 | 210 |
| 13 | $SBC_1/EVA_2/80\%$ $VLDPE_2/EVA_2/SBC_1$[12] +20% $VLDPE_3$ | 2.44:1 | 2.6:1 | 3.1:1 | .35 | 210 |
| 14 | $SBC_1/EVA_2/80\%$ $VLDPE_1/EVA_2/SBC_1$[13] +20% $EVa_2$ | 2.33:1 | 2.8:1 | 3.1:1 | .35 | 210 |
| 15 | $SBC_1/EVA_2/80\%$ $VLDPE_1/EVA_2/SBC_1$[14] +20% $VLDPE_3$ | 2.33:1 | 2.8:1 | 3.1:1 | .35 | 210 |
| 16 | $SBC_1/EVA_2/80\%$ $VLDPE_1/EVA_2/SBC_1$[15] +20% $VLDPE_3$ | 2.33:1 | 2.8:1 | 3.0:1 | .25 | 210 |
| 17 | $SBC_1/EVA_2/80\%$ $VLDPE_1/EVA_2/SBC_1$[16] +20% $VLDPE_4$ | 2.33:1 | 2.8:1 | 3.1:1 | .35 | 210 |
| 18 | $SBC_1/EVA_2/60\%$ $VLDPE_1/EVA_2/SBC_1$[17] +40% $VLDPE_4$ | 2.33:1 | 2.8:1 | 3.1:1 | .35 | 210 |
| 19 | $SBC_1/EVA_2/60\%$ $VLDPE_4/EVA_2/SBC_1$[18] +40% $VLDPE_1$ | 2.33:1 | 2.8:1 | 3.1:1 | .35 | 210 |
| 20 | $SBC_1/EVA_2/80\%$ $VLDPE_4/EVA_2/SBC_1$[19] +20% $VLDPE_1$ | 2.33:1 | 2.8:1 | 3.1:1 | .35 | 210 |
| 21 | $SBC_1/EVA_2/VLDPE_4/EVA_2/SBC_1$[20] | 2.33:1 | 2.8:1 | 3.1:1 | .35 | 210 |
| 22 | $SBC_1/EVA_2/80\%$ $VLDPE_4/EVA_2/SBC_1$[21] +20% $VLDPE_3$ | 2.33:1 | 2.8:1 | 3.1:1 | .35 | 210 |
| 23 | $SBC_1/EVA_2/90\%$ $VLDPE_4/EVA_2/SBC_1$[22] +10% $Pl_1$ | 2.33:1 | 2.8:1 | 3.1:1 | .35 | 210 |

[1]In each of Examples 2 through 23, the intermediate EVA layers were actually made up of a blend of 65% $EVA_2$ and 35% of a blend composition. The blend composition consisted of 88% $EVA_2$, 6% of an antifog material (Atmer 645 from ICI) and 6% of a glycerol monoleate (Atmer 1010 from ICI).
In each of Examples 2 through 23, .1% Irganox TM 1010 (a high molecular weight stabilizer available from Ciba Geigy) was present in the VLDPE layer.
In Examples 8 through 23, 2% by weight of the outermost layers constituted Atmer 645 and 2% constituted Atmer 1010.
In Examples 2 through 6, the VLDPE central or core layer actually was produced from two separate extruders with identical blend materials.
[2]The extruders feeding the outermost SBC layers (KR-10) were run @15 RPM.
[3]KR-10 @10 RPM.
[4]KR-10 @20 RPM L. O. Material.
[5]BIAX films are weak.
[6]Film is stronger.
[7]Film is softer.
[8]Reduced KR-10 from 10 to 5 RPM. Primary became wider with tail.
[9]Reduced KR-10 from 5 to 2.5 RPM. Film more elastic. The total amount of SBC resin is reduced to 7% of structure or about 1 gauge on each skin.
[10]KK-36 @3.0 RPM ran 12½ hours. To produce 130,000 ft. of film without bubble break. 23-52" × 5000 ft. mill logs.
[11]Not stable operation. Weaker film than Example 11
[12]Stable operation but strength is poorer than Dow resin blend.
[13]Couldn't maintain secondary bubble.
[14]Had to remove Irganox 1010 from core because of feed problems. 48-52" × 5000 ft. mill logs.
[15]Thinner film.
[16]Secondary bubble breaks due to gels.
[17]Secondary bubble breaks due to gels.
[18]Secondary bubble breaks due to gels.
[19]AMPS and shear temp. increased to 475° F. Gels reduced for stable secondary bubble.
[20]Shear temp. @500° F. No gel and very stable secondary bubble.
[21]Secondary bubble very unstable.
[22]Secondary bubble very stable.

It was found that as the thickness of the outermost layers was downgauged (by reducing the speed of the extruders feeding the SBC resin), the final film had better elasticity but more shrinkback as the film was aged. The additives (Atmer 645 and Atmer 1010) made the coextrudate softer.

Especially preferred films are those in which: the total film thickness is less than about 1 mil, more preferably than about 0.5 mils; the two outer layers each include between about 0.1% and 6%, more preferably about 4% of a plasticizer which makes the film more elastic (such as the Atmer 645 and Atmer 1010 antifog materials discussed above); the two outer layers each have a thickness of less than about 0.04 mils, more preferably less than about 0.02 mils, and most preferably about 0.01 mils (1 gauge); and the two outer layers each comprise less than about 4% of the total film thickness, and more preferably between about 1% and 3.5% of the total film thickness.

Films of the present invention can optionally be cross-linked. This can be done chemically or by the use of irradiation.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

Single layers from a roll of film having the construction $SBC_1/EVA_2/VLDPE_4/EVA_2/SBC_1$ were irradiated in 0.5 MR increments from 1 through 7.0 MR using an electron beam irradiation system. The roll was then placed on a heat seal hand-overwrap station using a 275° F. hot bar cutter and a variable temperature seal pad and subjectively evaluated for cutting ease while wrapping trayed product. All irradiated samples from 1 MR to approximately 5.0 MR cut satisfactorily for wrapping (Table 3). From 5.5 MR to 7.0 MR, however, cuttability was marginal to unacceptable. It should be noted that as the irradiation doses increased, shrinkback in the film increased which may have reduced the perceived cuttability as well.

The burn through threshold at each dose level was also evaluated by wrapping a single layer of sample film over the bottom of a 20S foam tray containing a ½ lb. block. The wrapped tray was then placed on a hot pad for one second at varying temperatures, then removed and evaluated for burnouts. The results appear in Table 3 and demonstrate the effect of the varying dosages on film burnout resistance. Values in parentheses denote a 10-second dwell time at 300° F. without film burnout. The results also demonstrate an irradiation threshold of 4.5 MR to achieve seal characteristics and heat tolerance characteristic similar to PVC.

TABLE 3

| Electron Beam Irradiated Film | | |
|---|---|---|
| Dosage (MR) | Hot Bar Cutting | Approximate Film Burnout Threshold (°F. for 1 Sec.) |
| 1 | Acceptable | 230° F.–240° F. |
| 2 | Acceptable | 250° F.–260° F. |
| 3 | Acceptable | 260° F.–270° F. |
| 3.5 | Acceptable | 270° F.–280° F. |
| 4.0 | Acceptable | 280° F.–290° F. |
| 4.5 | Acceptable | (>300° F.) |
| 5.0 | Acceptable | (>300° F.) |
| 5.5 | Marginal | (>300° F.) |
| 6.0 | Slightly Unacceptable | (>300° F.) |
| 6.5 | Unacceptable | (>300° F.) |
| 7.0 | Unacceptable | (>300° F.) |

Four rolls of the film were also gamma irradiated, as finished rolls, for similar evaluation. The dosage cuttability, and film burnout threshold appear in Table 4. The response of these samples to gamma irradiation is different from that of electron beam irradiated samples. On a dose-for-dose basis, the gamma samples did not have the burnout resistance nor cuttability characteristics observed with electron beam irradiated samples.

TABLE 4

| Gamma Irradiated Film | | |
|---|---|---|
| Dosage (MR) | Hot Bar Cutting | Approximate Film Burnout Threshold (°F. for 1 Sec.) |
| 2 | Acceptable | 230° F.–240° F. |
| 4 | Acceptable | 250° F.–260° F. |
| 6 | Acceptable | 250° F.–260° F. |
| 8 | Acceptable with less edge curl than other samples. | 270° F.–280° F. |

Single layers of film from the outside and the inside portions of each of the four gamma irradiated rolls were then wrapped around foam trays containing a 1 lb. block, placed on the hot pad sealer for up to 10 seconds at varying temperatures, then checked for burn through. Results of the evaluation appear in Table 5. Two and 4 MR dosage results in little to no burn through resistance regardless of location in the roll. Six and 8 MR dosage results in appreciable burn through resistance towards the inside or core of the roll as compared to the outer layers; this equates to greater sealability of the film.

TABLE 5

| Gamma Irradiation Analysis Handwrapper, 4S Trays, 1-Lb. Blocks | | |
|---|---|---|
| | Dosage | Burnout Threshold, 10 Seconds |
| Outside | 2.0 | 230–240° F. |
| Inside | 2.0 | 230–240° F. |
| Outside | 4.0 | 240–250° F. |
| Inside | 4.0 | 260–270° F. |
| Outside | 6.0 | 240–250° F. |
| Inside | 6.0 | 230–330° F. (340–350° F. for 1 Second) |
| Outside | 8.0 | 290–300° F. |
| Inside | 8.0 | >340° F. |

While the invention has been disclosed with reference to illustrative examples, those skilled in the art will understand that various modifications may be made to the invention as disclosed without departing from the sphere and scope of the claims which follow.

For example, in an alternative embodiment, a single layer of VLDPE may be adhered, either directly or by means of a polymeric adhesive layer, to a single layer of styrene butadiene copolymer by one of the methods disclosed herein, to produce a film with a preferred thickness of less than about 1 mil.

What is claimed is:

1. A biaxially oriented multilayer film comprising:
   (a) a core layer comprising a very low density polyethylene;
   (b) two outer layers each comprising a styrene butadiene copolymer; and
   (c) two intermediate layers each bonding the core layer to a respective outer layer, and comprising a polymeric adhesive.

2. The film of claim 1 wherein the two outer layers each include between about 0.1% and 6% by weight of each outer layer, of a plasticizer.

3. The film of claim 1 wherein the two outer layers each have a thickness of less than about 0.04 mils.

4. The film of claim 1 wherein the two outer layers each comprise less than about 4% of the total film thickness.

5. The film of claim 1 wherein the very low density polyethylene has a melt index before blending of no more than about 10 grams/10 minutes (ASTM D1238) (Condition 190/21.601).

6. The film of claim 1 wherein the very low density polyethylene has a flow rate ratio ($I_{21}/I_{2.1}$) before blending of at least about 40 (ASTM D 1238).

7. The film of claim 1 wherein the film is cross-linked.

8. A polymeric film oriented in primarily one direction comprises:
   (a) a core layer comprising a very low density polyethylene;
   (b) two outer layers each comprising styrene butadiene copolymer; and
   (c) two intermediate layers each bonding the core layer to a respective outer layer, and comprising a polymeric adhesive.

9. The film of claim 8 wherein the very low density polyethylene has a melt index before blending of no more than about 10 grams/10 minutes (ASTM D1238) (Condition 190/21.601).

10. The film of claim 8 wherein the very low density polyethylene has a flow rate ratio ($I_{21}/I_{2.1}$) before blending of at least about 40 (ASTM D 1238).

11. The film of claim 8 wherein the film is cross-linked.

* * * * *